United States Patent
Mamtimin et al.

(10) Patent No.: US 11,624,855 B2
(45) Date of Patent: Apr. 11, 2023

(54) HOLDUP ALGORITHM USING ASSISTED-PHYSICS NEURAL NETWORKS

(71) Applicant: Halliburton Energy Services, Inc., Houston, TX (US)

(72) Inventors: Mayir Mamtimin, Spring, TX (US); Jeffrey James Crawford, Katy, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 216 days.

(21) Appl. No.: 17/334,249

(22) Filed: May 28, 2021

(65) Prior Publication Data

US 2022/0171087 A1 Jun. 2, 2022

Related U.S. Application Data

(60) Provisional application No. 63/119,084, filed on Nov. 30, 2020.

(51) Int. Cl.
*E21B 49/00* (2006.01)
*G01V 5/10* (2006.01)

(52) U.S. Cl.
CPC .............. *G01V 5/105* (2013.01); *E21B 49/00* (2013.01); *G01V 5/101* (2013.01); *E21B 2200/22* (2020.05)

(58) Field of Classification Search
CPC ..... E21B 49/00; E21B 2200/22; G01V 5/101; G01V 5/105
See application file for complete search history.

(56) References Cited

U.S. PATENT DOCUMENTS

| 4,378,295 A | 3/1983 | Axtmann |
| 5,406,078 A | 4/1995 | Jacobson |
| 7,292,942 B2 | 11/2007 | Ellis et al. |
| (Continued) | | |

FOREIGN PATENT DOCUMENTS

WO 2011152924 12/2011

OTHER PUBLICATIONS

Schlumberger, RSTPro Water saturation, lithology, and porosity through casing, Jul. 2006.

(Continued)

*Primary Examiner* — Mark R Gaworecki
(74) *Attorney, Agent, or Firm* — John Wustenberg; C. Tumey Law Group PLLC (57) ABSTRACT

Systems and methods for determining holdup in a wellbore using a neutron-based downhole tool. In examples, the tool includes nuclear detectors that may measure gammas induced by highly energized pulsed-neutrons emitted by a generator. The characteristic energy and intensity of detected gammas indicate the elemental concentration for that interaction type. A detector response may be correlated to the borehole holdup by using the entire spectrum or the ratios of selected peaks. As a result, measurements taken by the neutron-based downhole tool may allow for a two component (oil and water) or a three component (oil, water, and gas) measurement. The two component or three component measurements may be further processed using machine learning (ML) and/or artificial intelligence (AI) with additional enhancements of semi-analytical physics algorithms performed at the employed network's nodes (or hidden layers).

20 Claims, 8 Drawing Sheets

(56) References Cited

U.S. PATENT DOCUMENTS

| | | |
|---|---|---|
| 2010/0292927 A1 | 11/2010 | Jacobson et al. |
| 2011/0202276 A1 | 8/2011 | Truax et al. |
| 2011/0282818 A1 | 11/2011 | Chen et al. |
| 2013/0105680 A1 | 5/2013 | Guo et al. |
| 2015/0083905 A1 | 3/2015 | Jacobson et al. |
| 2015/0108339 A1 | 4/2015 | Guo et al. |
| 2016/0216400 A1 | 7/2016 | Navarro-Sorroche et al. |
| 2016/0238736 A1 | 8/2016 | Guo et al. |
| 2016/0299251 A1 | 10/2016 | Luo et al. |
| 2016/0320523 A1* | 11/2016 | Inanc ................. G01V 5/12 |
| 2017/0089846 A1 | 3/2017 | Guo et al. |
| 2017/0145821 A1 | 5/2017 | Hu et al. |
| 2017/0167243 A1 | 6/2017 | Guo et al. |
| 2017/0199298 A1 | 7/2017 | Hu et al. |
| 2017/0211382 A1 | 7/2017 | Jacobson et al. |
| 2018/0038990 A1 | 2/2018 | Hu et al. |
| 2018/0210109 A1 | 7/2018 | Guo et al. |
| 2018/0245451 A1 | 8/2018 | Hu et al. |
| 2018/0246250 A1 | 8/2018 | Navarro Sorroche et al. |
| 2018/0267200 A1 | 9/2018 | Hu et al. |
| 2018/0292204 A1 | 10/2018 | Lee et al. |
| 2018/0329109 A1 | 11/2018 | Navarro Sorroche et al. |
| 2019/0010800 A1 | 1/2019 | Hu et al. |
| 2019/0056525 A1 | 2/2019 | Hu et al. |
| 2020/0109626 A1 | 4/2020 | Hu et al. |
| 2020/0199995 A1 | 6/2020 | Hu et al. |

OTHER PUBLICATIONS

Peeters, M , (1994). Pulsed neutron tools applied to three-phase production-logging in horizontal wells. SPWLA 35th Annual Loggin (Accessed Jun. 4, 2021).

Galford, J., Truax, J , Hrametz, A., & Haramboure, C. (2009). A new neutron-induced gamma-ray spectroscopy tool for geochemical logging. SPWLA 50th Annual Logging Symposium 2009, 1-14 (Accessed Jun. 4, 2021).

Hertzog, R.C. (1980). Laboratory and Field Evaluation of an Inelastic Neutron Scattering and Capture Gamma Ray Spectrometry Tool. Society of Petroleum Engineers Journal, 20(5), 327-340 (Accessed Jun. 4, 2021).

Evans, et al., lioli, . [Society of Petroleum Engineers SPE Annual Technical Conference and Exhibition—San Antonio, Texas, USA (Oct. 8, 2012)] SPE Annual Technical Conference and Exhibition—Sourceless Neutron-Gamma Density (SNGD): A Radioisotope-Free Bulk Density Measurement: Physics Principles, Environmental Effects, and Applications (Accessed Jun. 4, 2021).

Trcka, D. (1996). Measuring Three-Phase Holdup in Horizontal Wellbores Using Pulsed Neutron Instruments. SPE 36561, 759-766 (Accessed Jun. 4, 2021).

Roscoe, B. A. (1996). Three-Phase Holdup Determination in Horizontal Wells Using a Pulsed-Neutron Source. SPE 37147, 895-905 (Accessed Jun. 4, 2021).

Peeters, M., (1994) Pulsed neutron tools applied to three-phase production-logging in horizontal wells. SPWLA 35th Annual Logging Symposium 1994.

Trcka, D. (1996). Measuring Three-Phase Holdup in Horizontal Wellbores Using Pulsed Neutron Instruments. SPE 36561, 759-766.

Roscoe, B. A. (1996). Three-Phase Holdup Determination in Horizontal Wells Using a Pulsed-Neutron Source. SPE 37147, 895-905.

Halliburton, Nuclear Magnetic Resonance (NMR) Logging, Xaminer Magnetic Resonance (SMR) Service, High-Resolution, High-Efficiency, New NMR Technology, HO12700, May 2018.

Halliburton, Well Integrity Services You Can Trust, HO13826, Apr. 2021.

* cited by examiner

HOLDUP ALGORITHM USING ASSISTED-PHYSICS NEURAL NETWORKS

BACKGROUND

Operators of existing wells often track borehole holdup, especially in horizontal wellbores. Holdup is defined as a reference to multiphase flow in pipes, the fraction of a particular fluid present in an interval of pipe. In multiphase flow, each fluid moves at a different speed due to different gravitational forces and other factors, with the heavier phase moving slower, or being more held up, than the lighter phase. The holdup of a particular fluid is not the same as the proportion of the total flow rate due to that fluid, also known as the fluids "cut." To determine in-situ flow rates, it is necessary to measure the holdup and velocity of each fluid. Borehole holdup measures the volumetric ratios of oil, water, and gas components in a wellbore.

Holdup may be measured by a variety of logging tools; however, a pulsed-neutron logging tool may be a primary tool used for holdup measurements. Additionally, accurate knowledge of the borehole holdup determines the accuracy of oil saturation in the formation as well as determining the flow in horizontal production wells. Traditional holdup measurements fail to provide accurate hold up measurements in horizontal wells because of fluid/gas segregation due to gravity. This causes current systems and methods to be inaccurate and inconsistent when measuring hold up.

BRIEF DESCRIPTION OF THE DRAWINGS

These drawings illustrate certain aspects of some examples of the present disclosure and should not be used to limit or define the disclosure.

DETAILED DESCRIPTION

The present disclosure generally relates to systems and methods for determining holdup in a wellbore using a neutron-based downhole tool. In examples, the neutron-based downhole tool includes nuclear detectors that may measure gammas induced by energized pulsed-neutrons emitted by a generator. Specifically, the characteristic energy and intensity of detected gammas indicate the elemental concentration of the matter that the gammas interacted with. During measurement operations, a detector response may be correlated to borehole holdup by using an entire spectrum or ratios of selected peaks from a measurement data set. As a result, measurements taken by the neutron-based downhole tool may allow for a two component (oil and water) or a three component (oil, water, and gas) measurement. The two component or three component measurements may be further processed using machine learning (ML) and/or artificial intelligence (AI) with additional enhancements of semi-analytical physics algorithms performed at the employed network's nodes (or hidden layers). In examples, using an assisted-physics implementation that is guided by physics and applied in ML and AI applications may improve ratios or spectral vectors found during measurement operations. Additionally, an assisted neural network may utilize variables such as account hole-size, casing-size, tool standoff, porosity, saturation, and lithology to characterize borehole and formation variations.

Figure 1:
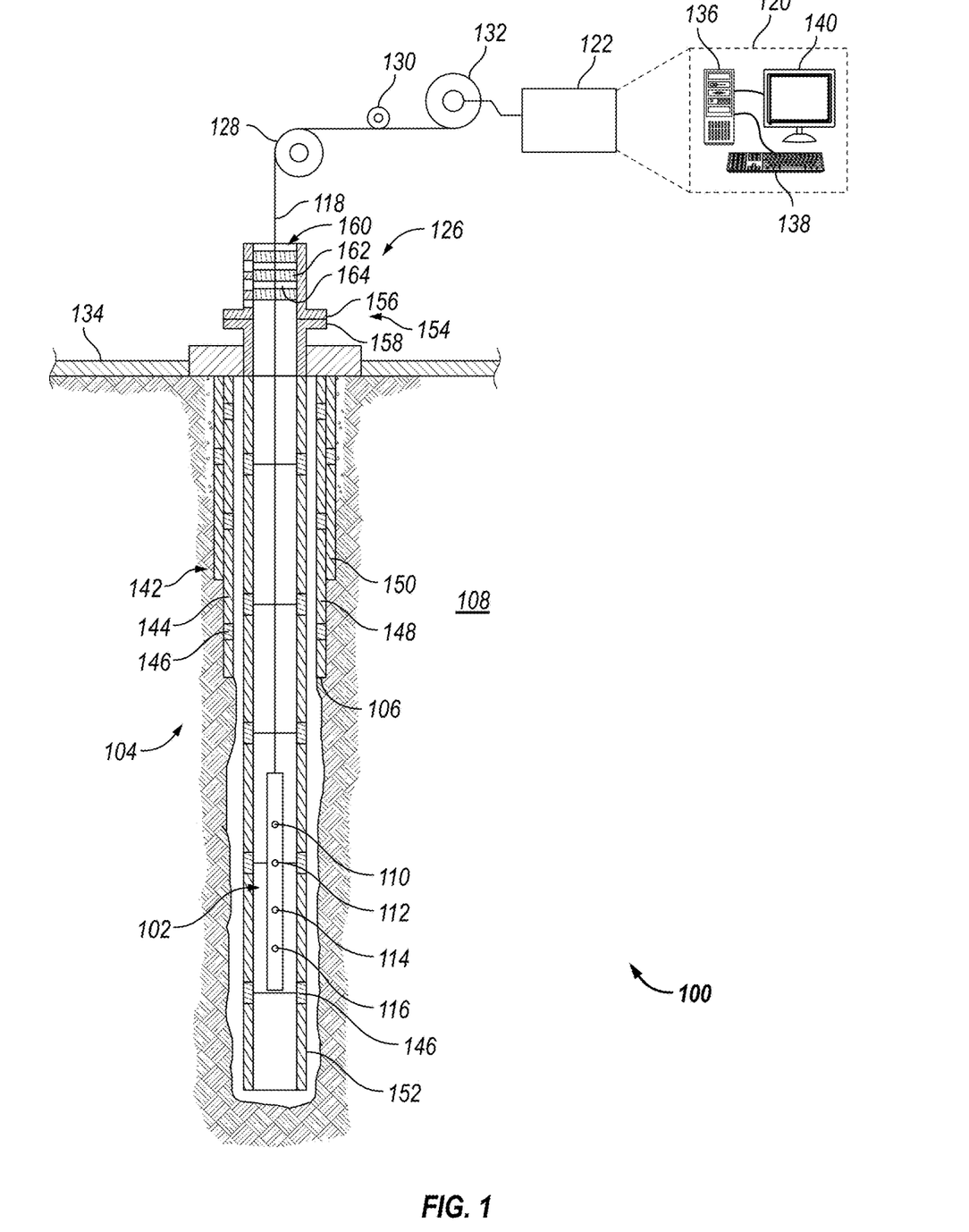
FIG. 1 illustrates a downhole tool in a wireline configuration, in accordance with examples of the present disclosure.

FIG. 1 illustrates logging/measuring operation 100, as disclosed herein, utilizing a pulsed-neutron logging tool 102. FIG. 1 illustrates a cross-section of borehole 104 with a pulsed-neutron logging tool 102 traveling through well casing 106. Borehole 104 may traverse through formation 108 as a vertical well and/or a horizontal well. Pulsed-neutron logging tool 102 contains a neutron source 110, a first neutron detector 112, a second neutron detector 114, and a gamma ray detector 116. Pulsed-neutron logging tool 102 is suspended by a conveyance 118, which communicates power from a logging facility 120 to pulsed-neutron logging tool 102 and communicates telemetry from pulsed-neutron logging tool 102 to information handling system 122. In examples, pulsed-neutron logging tool 102 may be operatively coupled to a conveyance 118 (e.g., wireline, slickline, coiled tubing, pipe, downhole tractor, and/or the like) which may provide mechanical suspension, as well as electrical connectivity, for pulsed-neutron logging tool 102. Conveyance 118 and pulsed-neutron logging tool 102 may extend within casing string 142 to a desired depth within borehole 104. Conveyance 118, which may include one or more electrical conductors, may exit wellhead 126, may pass around pulley 128, may engage odometer 130, and may be reeled onto winch 132, which may be employed to raise and lower the tool assembly in borehole 104. The position of pulsed-neutron logging tool 102 may be monitored in a number of ways, including an inertial tracker in pulsed-neutron logging tool 102 and a paid-out conveyance length monitor in logging facility 120 (e.g., an idler wheel on the wireline cable).

Multiple such measurements may be desirable to enable the system to compensate for varying cable tension and cable stretch due to other factors. Information handling system 122 in logging facility 120 collects telemetry and position measurements and provides position-dependent logs of measurements from pulsed-neutron logging tool 102 and values that may be derived therefrom.

Pulsed-neutron logging tool 102 generally includes multiple instruments for measuring a variety of downhole parameters. Wheels, bow springs, fins, pads, or other centralizing mechanisms may be employed to keep pulsed-neutron logging tool 102 near the borehole axis during measurement operations. During measurement operations, generally, measurements may be performed as pulsed-neutron logging tool 102 is drawn up hole at a constant rate. The parameters and instruments may vary depending on the needs of the measurement operation.

Pulsed-neutron logging tool 102 operates by generating pulses of high energy neutrons that radiate from neutron source 110 into the surrounding environment including borehole 104 and formation 108. The highly energetic neutrons entering the surrounding environment interact with atomic nuclei, inducing gamma radiation. The induced gamma rays may be recorded as a scattering rate (and hence the rate of energy loss) and are generally dominated by the concentration of hydrogen atoms. Induced gamma rays and neutrons may be recorded by first neutron detector 112, second neutron detector 114, and/or gamma ray detector 116. As the presence of hydrogen is primarily attributable to the presence of water or hydrocarbon fluids, the rate of energy loss and gamma spectrum may yield accurate knowledge of borehole holdup. Accurate knowledge of the borehole holdup determines the accuracy of oil saturation in the formation as well as determining the flow in horizontal production wells.

Measurements taken by pulsed-neutron logging tool 102 may be gathered and/or processed by information handling system 122. For example, signals recorded by pulsed-neutron logging tool 102 may be sent to information handling system 122 where they may be stored on memory and then processed. The processing may be performed real-time during data acquisition or after recovery of pulsed-neutron logging tool 102. Processing may alternatively occur downhole on an information handling system 101 disposed on pulsed-neutron logging tool 102 or may occur both downhole and at surface. In some examples, signals recorded by pulsed-neutron logging tool 102 may be conducted to information handling system 122 by way of conveyance 118. Information handling system 122 may process the signals, and the information contained therein may be displayed for an operator to observe and stored for future processing and reference. Information handling system 122 may also contain an apparatus for supplying control signals and power to pulsed-neutron logging tool 102.

As noted above, systems and methods of the present disclosure may be implemented, at least in part, with information handling system 122. While shown at surface 134, information handling system 122 may also be located at another location that is remote from borehole 104. In examples information handling system 122 may be disposed on pulsed-neutron logging tool 102, which may allow for processing to occur downhole. Additionally, on or more information handling systems 122 may be utilized during measurement operations. In such examples, a first information handling system 122 may be at surface 134 and a second information handling system 122 may be disposed on pulsed-neutron logging tool 102 downhole. Information handling system 122 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 122 may be a processing unit 136, a network storage device, or any other suitable device and may vary in size, shape, performance, functionality, and price. Information handling system 122 may include random access memory (RAM), one or more processing resources such as a central processing unit (CPU) or hardware or software control logic, ROM, and/or other types of nonvolatile memory. Additional components of the information handling system 122 may include one or more disk drives, one or more network ports for communication with external devices as well as an input device 138 (e.g., keyboard, mouse, etc.) and video display 140. Information handling system 122 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 further illustrates a typical casing string 142 may extend from wellhead 126 at or above ground level to a selected depth within borehole 104. Casing string 142 may comprise a plurality of joints 144 or segments of casing string 142, each joint 144 being connected to the adjacent segments by a collar 146. There may be any number of layers in casing string 142. For example, a first casing 148 and a second casing 150. It should be noted that there may be any number of casing layers. FIG. 1 also illustrates a typical pipe string 152, which may be positioned inside of casing string 142 extending part of the distance down borehole 104. Pipe string 152 may be production tubing, tubing string, casing string, or other pipe disposed within casing string 142. Pipe string 152 may comprise concentric pipes. It should be noted that concentric pipes may be connected by collars 146. Pulsed-neutron logging tool 102 may be dimensioned so that it may be lowered into borehole 104 through pipe string 152, thus avoiding the difficulty and expense associated with pulling pipe string 152 out of borehole 104. In examples, cement (not illustrated) may be disposed on the outside of pipe string 152. Cement may further be disposed between pipe string 152 and casing string 142. It should be noted that cement may be disposed between any number of casings, for example between first casing 148 and second casing 150.

In logging systems, such as, for example, logging systems utilizing the pulsed-neutron logging tool 102, a digital telemetry system may be employed, wherein an electrical circuit may be used to both supply power to pulsed-neutron logging tool 102 and to transfer data between information handling system 122 and pulsed-neutron logging tool 102. A DC voltage may be provided to pulsed-neutron logging tool 102 by a power supply located above ground level, and data may be coupled to the DC power conductor by a baseband current pulse system. Alternatively, pulsed-neutron logging tool 102 may be powered by batteries located within the downhole tool assembly, and/or the data provided by pulsed-neutron logging tool 102 may be stored within the downhole tool assembly, rather than transmitted to the surface during logging (corrosion detection).

With continued reference to FIG. 1, wellhead 126 is described. Wellhead 126 allows for entry into borehole 104, such as the placement of pulsed-neutron logging tool 102 into pipe string 152. In examples, wellhead 126 may include a lubricator head 154 may comprise a lubricator head flange 156 which may be coupled to and sealed with lubricator body flange 158. Lubricator head 154 comprises sealing cartridge 160. Sealing cartridge 160 may be removable from lubricator head 154. Sealing cartridge 160 may be a container comprising a plurality of sealing elements 162 and lubricator cavities 164. Sealing elements 162 may comprise, but are not limited to, elastomeric materials, thermoplastic materials, thermosetting materials, composites thereof, or combinations thereof. Sealing elements 162 comprise an inner diameter to allow for pulsed-neutron logging tool 102, conveyance 118, wireline, coiled tubing, and/or the like to be disposed into borehole 104. Sealing elements 162 form a seal around conveyance 118 (or tubing if provided). Sealing elements 162 are selected such that the length of the diameter of the inner diameter is able to sufficiently seal around conveyance 118. In some example methods, a sealing cartridge 160 comprising a plurality of sealing elements 162 of one size may be removed if desired and exchanged for a different sealing cartridge 160 comprising a plurality of sealing elements 162 of a different size if desired. For example, if a wireline operation requires sealing elements 162 of a first size, upon completion of said wireline operation, the sealing cartridge 160 comprising the sealing elements 162 of a first size may be removed from lubricator head 154 and replaced with a second sealing cartridge 160 comprising sealing elements 162 of a second size to perform a subsequent operation, for example a tripping operation.

Figure 2:
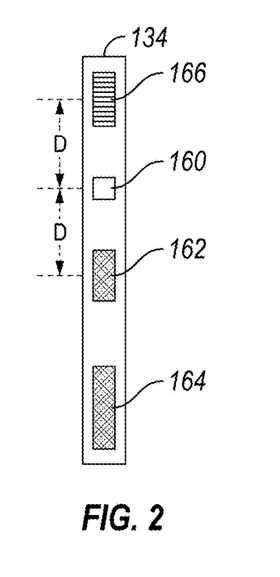
FIG. 2 is a diagram of illustrative embodiments of a pulsed-neutron logging tool.

FIG. 2 shows a first illustrative setup of pulsed-neutron logging tool 102 having a pulsed neutron source 110 that is positioned equidistant from a gamma ray detector 166 and a first neutron detector 112. In examples, pulsed neutron source 110 may be replaced with a continuous neutron source such as Americium-Beryllium (Am—Be) chemical source. Pulsed-neutron logging tool 102 may also include a second neutron detector 114. The two neutron detectors 112 and 114 may be, respectively, termed the "near" and "far" neutron detectors. "Near" being the closest neutron detector to pulsed neutron source 110 and "far" being the furthest neutron detector from pulsed neutron source 110. Neutron detectors 112 and 114 may be designed to count thermal (around about 0.025 eV) and/or epithermal (between about 0.1 eV and 100 eV) neutrons. Suitable neutron detectors include Helium-3 (He-3) filled proportional counters, though other neutron counters may also be used. To improve tool performance, each neutron detector 112 and/or 114 may be implemented as a bank of individual detection devices. In accordance with standard neutron porosity tool measurement techniques, the ratio of far-to-near neutron detector counts is indicative of formation porosity.

With continued reference to FIG. 2 gamma ray detector 166 may be implemented as a scintillation crystal coupled to a photomultiplier tube. As with neutron detectors 112 and/or 114, gamma ray detector 166 may be implemented as a bank of individual detection devices whose results are aggregated. In FIG. 2, gamma ray detector 166 is "co-distant" with the near neutron detector 112, i.e., it is positioned at the same distance D from neutron source 110 as near neutron detector 112. As illustrated in FIG. 2, gamma ray detector 166 and first neutron detector 112 may be located in opposite directions from neutron source 110.

Figure 3A:
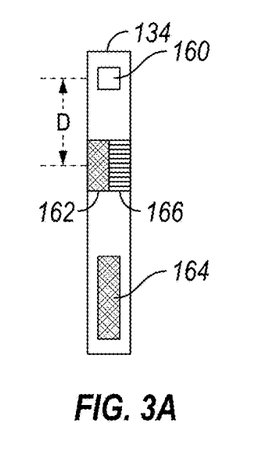
FIGS. 3A&3B are diagrams of alternative embodiments of a pulsed-neutron logging tool.
Figure 3B:
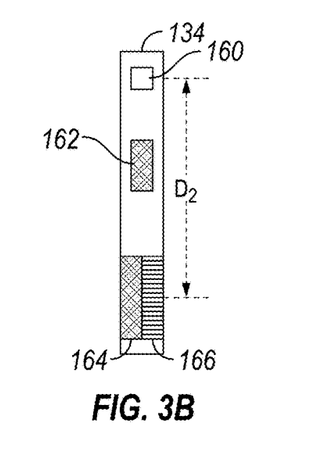

As discussed above, FIGS. 3A and 3B illustrate alternative embodiments of pulsed-neutron logging tool 102. FIG. 3A shows an alternative example in which pulsed-neutron logging tool 102 that has a gamma ray detector 166 and a near neutron detector 112 co-located, i.e., located side-by-side at the same distance D from the neutron source 110. FIG. 3B shows yet another alternative example in which pulsed-neutron logging tool 102 has a gamma ray detector 166 and a far neutron detector 114 co-located at a distance D2 from neutron source 110.

Multiple neutron detectors 112, 114 of pulsed-neutron logging tool 102, enable pulsed-neutron logging tool 102 to measure formation porosity using any of the existing multiple-spacing techniques. In addition, the presence of gamma ray detector 166 having a common distance from neutron source 110 with one of the neutron detectors 112 or 114, enables the measurement of borehole holdup, discussed below.

Figure 4:
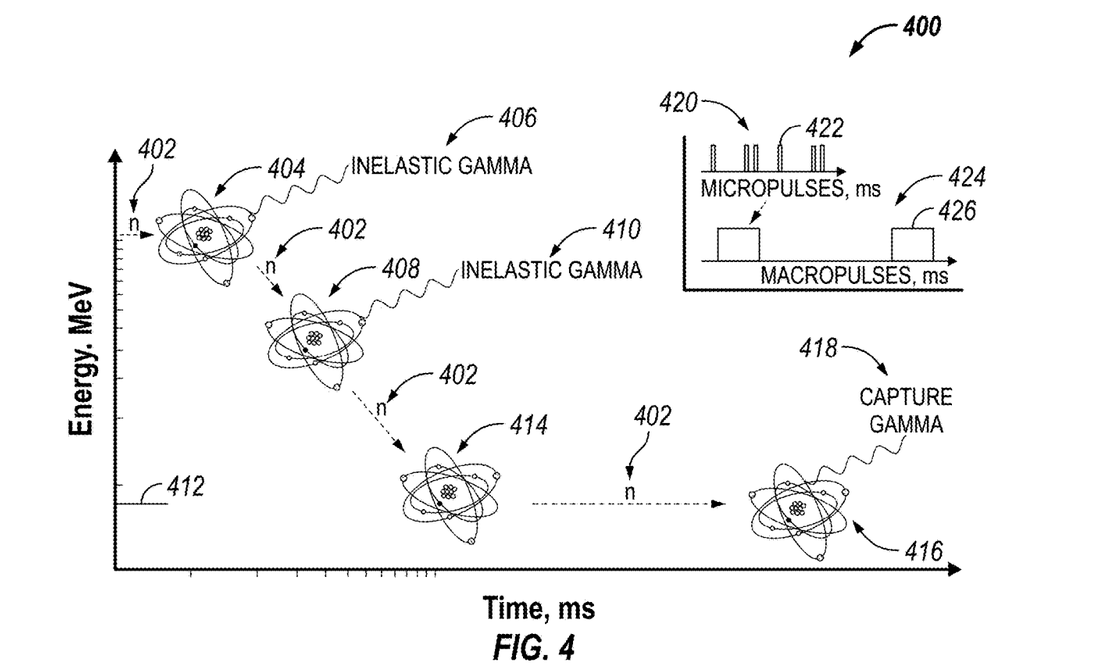
FIG. 4 illustrates the energy of a neutron as it interacts in the present disclosure.

During measurement operations, neutrons emitted from neutron source 110 undergo weak electromagnetic scattering and/or nuclear absorption when interacting with matter. Scattering may either be elastic (n, n) or inelastic (n, n'). In an elastic interaction a fraction of the neutrons kinetic energy is transferred to the nucleus. An inelastic interaction is similar, except the nucleus undergoes an internal rearrangement. Additionally, neutrons may also undergo an absorption interaction. In most absorption interactions, elastic cross section is nearly constant, whereas the inelastic scattering cross section and absorption cross sections are proportional to the reciprocal of the neutrons speed. Referring to FIG. 4, heavy nuclei 420 have large and narrow resonances 422 that appears for neutrons in the eV range, whereas light nuclei 424 have broad and smaller resonances 426 that appear in the MeV.

FIG. 4 illustrates a graph 400 that depicts different scattering by a neutron 402. As illustrate, neutron 402 may be traveling at a fast speed with high kinetic energy and interacts with nuclei 404, releasing inelastic gamma 406 and lowering the energy state of nuclei 404. After the interaction, neutron 402 contains too much energy to be absorbed, thus continues its path until it interacts with nuclei 408 releasing inelastic gamma 410 and again lowering its energy state again. After the interaction, neutron 402 has the kinetic energy close to target energy 412. Thus, when neutron 402 at target energy 412 interacts with nuclei 414 it will be captured. This interaction results in a rearranged nucleus 416 containing previously traveling neutron 402 and an emitted capture gamma 418. Sensing these events with pulsed-neutron logging tool 102 using first neutron detector 112, second neutron detector 114, and/or gamma ray detector 166 (e.g., referring to FIG. 1) may allow for the identification of oil, gas, and/or water in borehole 104 (e.g., referring to FIG. 1).

Figure 5A:
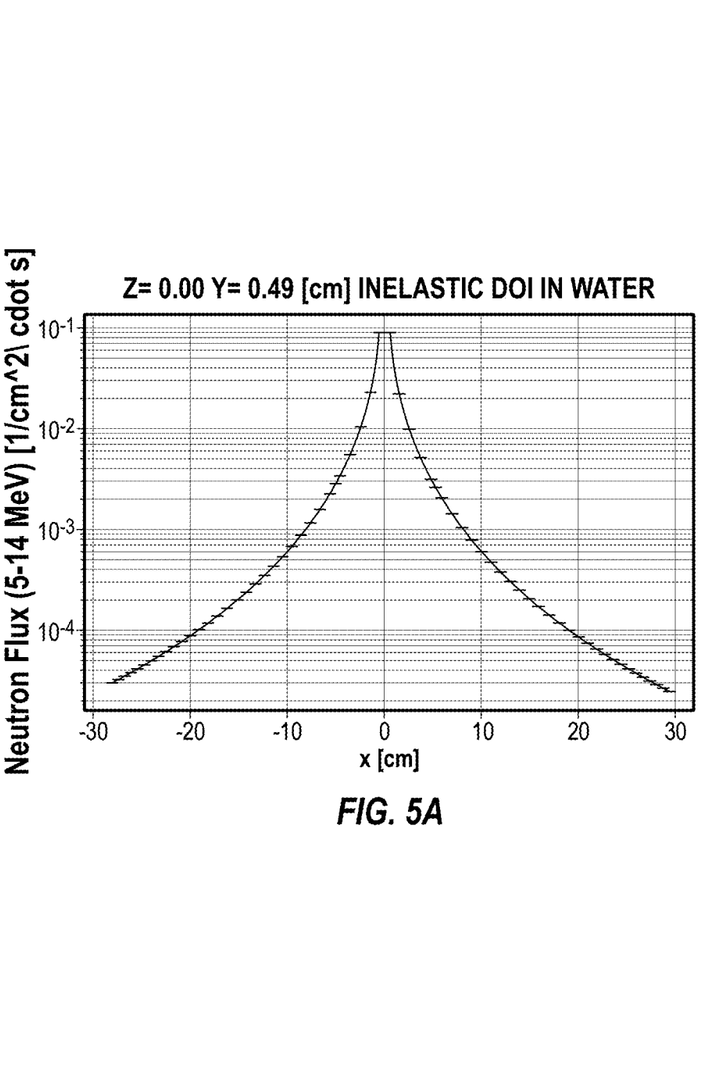
FIGS. 5A & 5B illustrates the depth of penetration for an inelastic neutron.
Figure 5B:
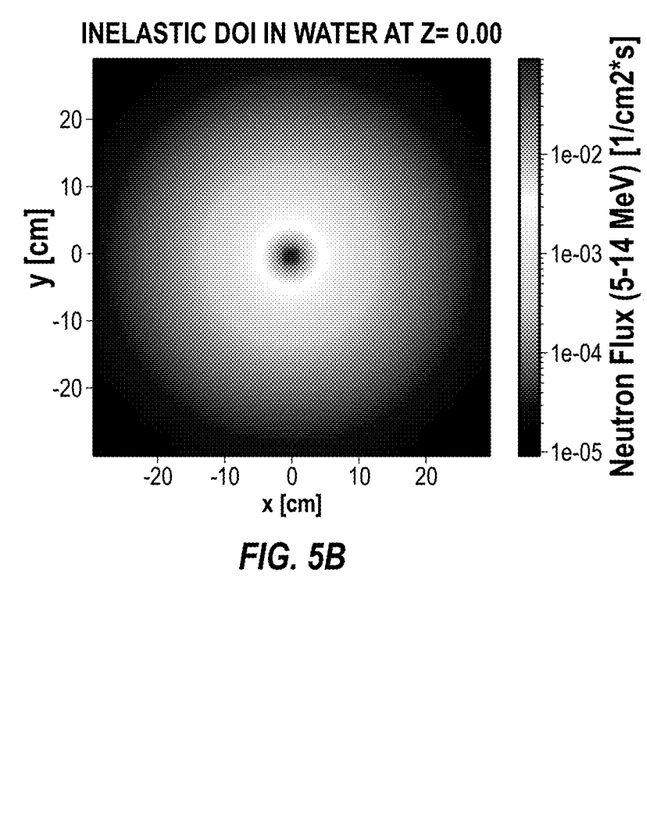

As discussed above, two scattering events, elastic and inelastic, may be recorded by first neutron detector 112, second neutron detector 114, and/or gamma ray detector 166 (e.g., referring to FIG. 1). During operations, pulsed-neutron logging tool 102 (e.g., referring to FIG. 1) may utilize known physics associated with elastic and inelastic scattering events to determine the material in a borehole environment. For example, when the physics of inelastic neutron scattering is used, as with carbon and oxygen interactions, neutron energy range of interest is 5 to 14 MeV. The penetration depth of 5 to 14 MeV neutron determines the depth of investigation (DOI). As illustrated in FIGS. 5A and 5B, the inelastic neutron DOI may be about six centimeters, which is illustrated in a line graph and intensity graph, respectively. However, for most materials, characteristic length end-point energy is set at 0.4 eV, which to calculate the DOI for a specific energy range, a Monte Carlo N-Particle (MCNP) algorithm may be used. As noted above, elastic and inelastic physics is widely known and used for investigating materials in borehole 104 and around formation 108 (e.g., referring to FIGS. 1 and 2). However, these methods have limitations for investigations. Discussed below are methods that may be used in place of or with inelastic or elastic physics methods.

Figure 6A:
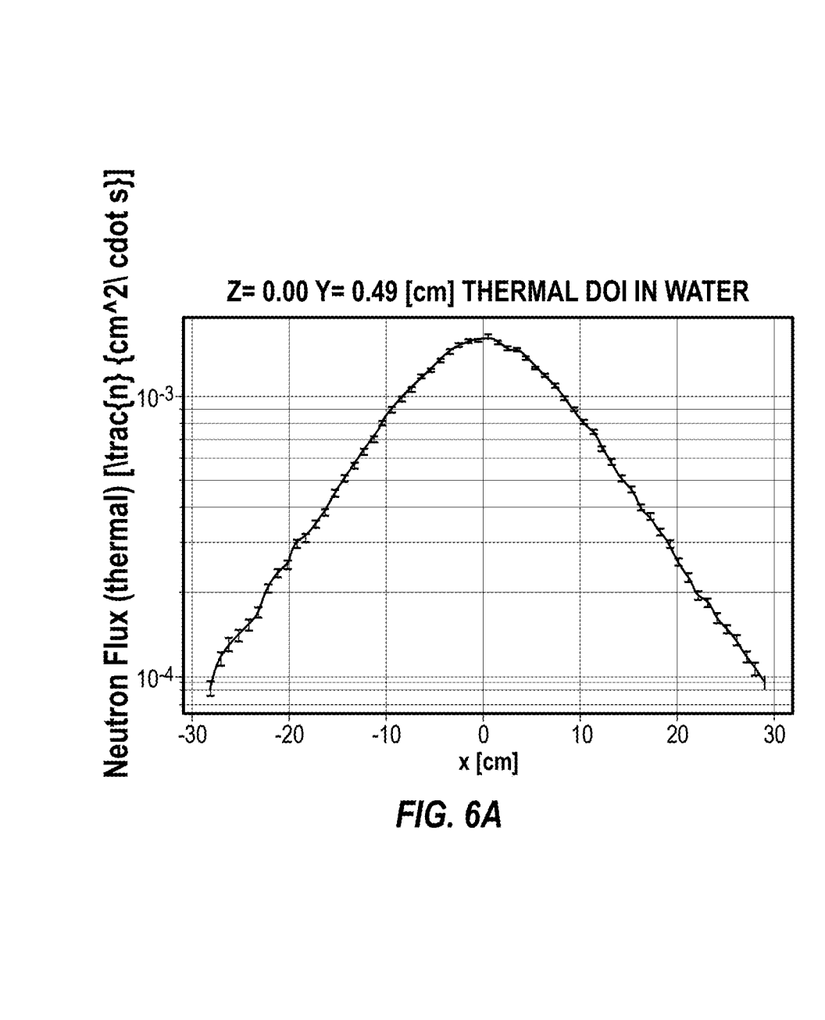
FIGS. 6A & 6B illustrates the depth of penetration for a thermal neutron.
Figure 6B:
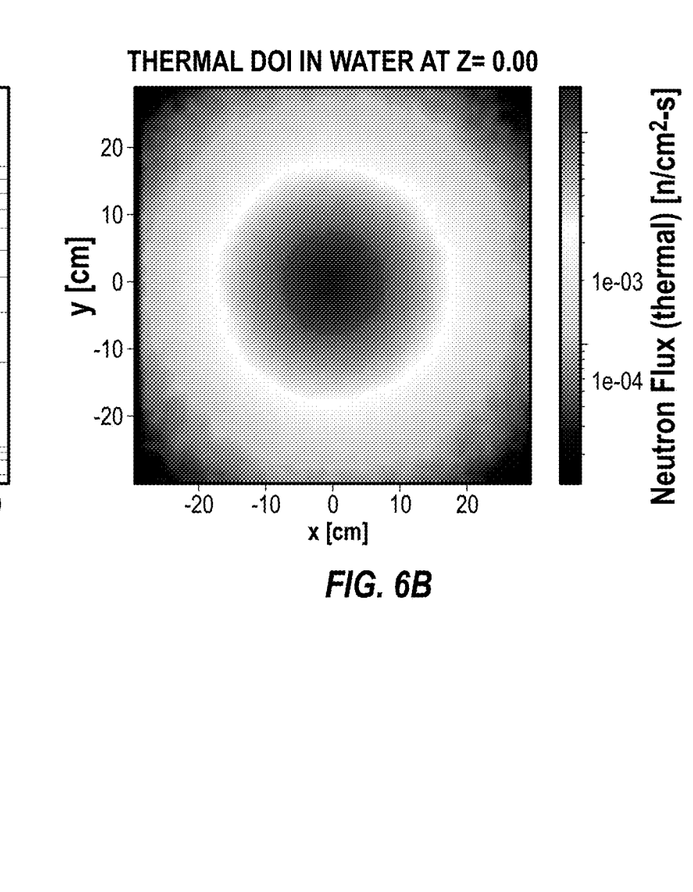

Referring to FIGS. 6A and 6B, thermal neutron physics may be used to replace inelastic or elastic methods. For example, when thermal neutron physics is used, thermal neutron penetration depth for DOI may be about twenty-three centimeters, which is illustrated in a line graph and intensity graph, respectively. Thus, for DOI, thermal neutron penetration may be more beneficial than inelastic methods. This may be due to water in borehole 104 (e.g., referring to FIGS. 1 and 2) which has a high lethargy value. The lethargy value may shorten the depth of penetration of fast neutrons while allowing thermal neutrons to penetrate deeper.

Another method of investigation for pulsed-neutron logging tool 102 (e.g., referring to FIGS. 1 and 2) may be an assisted-physics approach. An example of assisted-physics approach, one indicator of a carbon signal may be obtained using the inelastic gamma from fast neutron interaction with carbon nucleus. In this reaction fast neutron excites the carbon nucleus to an energetic compound state, then the energy levels relax to emit a characteristic 4.43 MeV via C12(n, n') C12 reaction. Reaction cross section is nearly flat from 5 MeV to 14 MeV. A single cross section value may be used for this analysis (average ~300 mb). With this, the production intensity of 4.43 MeV gammas in a given volume of material may be formulated using the following:

$$I_{\gamma=4.43\,MeV} = T_c * \sigma_{inelastic} * \varphi_{5\sim14\,MeV} \quad (1)$$

where $T_c$ is the carbon atomic density in the identified material, $\sigma_{inelastic}$ is the inelastic cross section of carbon, and $\varphi_{5\sim14\,MeV}$ is the neutron flux at a given point as single-phase fast energy. A fast neutron single-phase flux may be identified as generated gamma particle from measurement operations, discussed above, that have attenuated through the identified material and reach first neutron detector 112, second neutron detector 114, and/or gamma ray detector 166 (e.g., referring to FIG. 1). Thus, the detector count rate at 4.43 MeV may be formulated as $$\text{Count Rate} = I_\gamma e^{-\mu \rho x} \quad (2)$$

Figure 7:
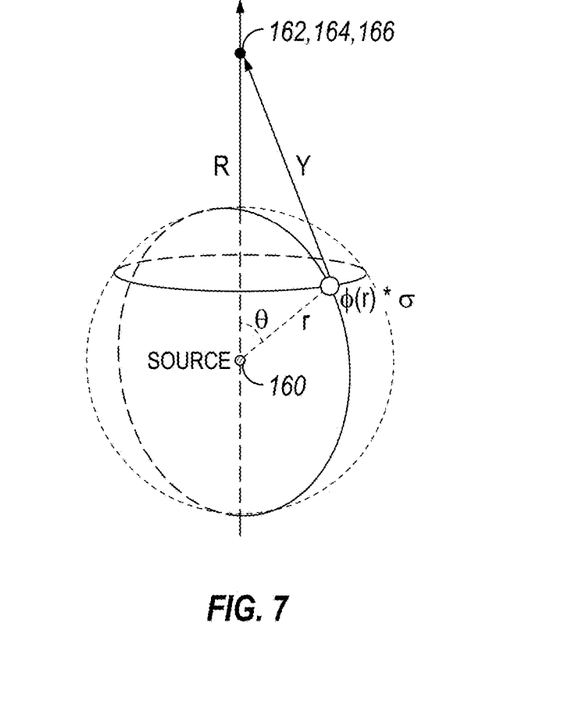
FIG. 7 depicts the neutron source in relation to the first and second neutron detectors as well as the gamma ray sensor.

FIG. 7 illustrates a neutron source 110 (e.g., referring to FIG. 1) surrounded by a medium with bulk density of ρ and carbon atomic density Nc. By integrating over radius, polar angle, and azimuthal angle, a total gamma production may be produced. Produced gammas attenuate through the medium to first neutron detector 112, second neutron detector 114, and/or gamma ray detector 166.

In examples, where µ is mass attenuation coefficient at 4.43 MeV, and ρ is the bulk material density, and x is the material thickness for gamma attenuation (distance between gamma creation and first neutron detector 112, second neutron detector 114, and/or gamma ray detector 166). Integrating over all coordinates the following equations are used:

$$CR_{4.43MeV} = \int_0^{2\pi}\int_0^R\int_0^\pi \left(\frac{S\sigma T_c}{4\pi D}\frac{e^{-\frac{r}{L_s}}}{r}e^{-\mu\rho x}\right)d\theta\,dr\,d\varphi \quad (3)$$

$$x = R - r\cos\theta \quad (4)$$

$$CR_{4.43MeV} = \frac{S\sigma_{(n,n)}T_c}{4\pi D}e^{-\mu\rho R}\left[\begin{array}{c}A_1(\mu\rho)^3 + A_2(\mu\rho)^2 +\\ A_3(\mu\rho) + A_4\end{array}\right] \quad (5)$$

Similarly, Oxygen fast neutron interaction includes two types of reactions:
1. $^{16}O\,(n,\,p)^{16}N$ which decay by beta mode with 7.13 second half-life.
2. $^{16}O\,(n,\,a)^{13}C$ with a characteristic prompt gamma emission at 3.68 MeV.

Extending the same formulation for oxygen inelastic scattering, $$CR_{6.13MeV} = \frac{S\sigma_{(n,p)}T_0}{4\pi D}e^{-\mu'\rho R}\left[\begin{array}{c}B_1(\mu'\rho)^3 + B_2(\mu'\rho)^2 +\\ B_3(\mu'\rho) + B_4\end{array}\right] \quad (6)$$

$$CR_{3.68MeV} = \frac{S\sigma_{(n,a)}T_0}{4\pi D}e^{-\mu'\rho R}\left[\begin{array}{c}C_1(\mu''\rho)^3 + C_2(\mu''\rho)^2 +\\ C_3(\mu''\rho) + C_4\end{array}\right] \quad (7)$$

The above-described model is derived from the fundamental relations and interaction mechanism (with minimum assumptions). Additionally, it is necessary to express diffusion length (D) separately for borehole diffusion length and formation diffusion length. D-BH is the borehole diffusion length characterized by macroscopic scattering cross section. D-FM is the formation diffusion length is characterized by porosity, saturation, and lithology. Changing the notation to CR4 and CR6 to represent peak count rates from carbon and oxygen for simplicity, splitting the contribution to borehole 104 and formation 108, the following equations may be used:

$$CR4 = CR4_{BH} + CR4_{FM} \quad (8)$$

$$= \frac{S\sigma_{(n,n)}}{4\pi}\left[\left(\frac{T_c}{D}\right)_{BH}\left(\frac{e^{-\mu\rho_{BH}R}}{}\left[\begin{array}{c}A_1(\mu\rho_{BH})^3 + A_2(\mu\rho_{BH})^2 +\\ A_3(\mu\rho_{BH}) + A_4\end{array}\right]\right) + \left(\frac{T_c}{D}\right)_{FM}\left(e^{-\mu\rho_{FM}R}\left[\begin{array}{c}A_5(\mu\rho_{FM})^3 + A_6(\mu\rho_{FM})^2 +\\ A_7(\mu\rho_{FM}) + A_8\end{array}\right]\right)\right]$$

$$CR6 = CR6_{BH} + CR6_{FM} \quad (9)$$

$$= \frac{S\sigma_{(n,p)}}{4\pi}\left[\left(\frac{T_0}{D}\right)_{BH}\left(e^{-\mu\rho_{BH}R}\left[\begin{array}{c}B_1(\mu\rho_{BH})^3 + B_2(\mu\rho_{BH})^2 +\\ B_3(\mu\rho_{BH}) + B_4\end{array}\right]\right) + \left(\frac{T_0}{D}\right)_{FM}\left(e^{-\mu\rho_{FM}R}\left[\begin{array}{c}B_5(\mu\rho_{FM})^3 + B_6(\mu\rho_{FM})^2 +\\ B_7(\mu\rho_{FM}) + B_8\end{array}\right]\right)\right]$$

Thus, using the assisted-physics method described above allows for the construction of features that are fundamental to the correlation of measurement to holdup. These include simple features such as ratios of count rates or more complex features such as spectral vectors for transformed vector based on assisted-physics algorithms.

Another method that may be utilized with pulsed-neutron logging tool 102 (e.g., referring to FIGS. 1 and 2) may be a semi-analytical formulation of borehole carbon and oxygen concentration that is at least partially based on an analysis of neutron source 110 and its interaction mechanism that eventually determines a response of first neutron detector 112, second neutron detector 114, and/or gamma ray detector 166. Holdup determination is a convoluted problem where the exact analytical solution is highly phenomenological. Therefore, in order to develop a holdup algorithm that is inclusive and general, a final solution has to allow certain approximation. The first step of model development is to find "features" that directly correlates to the borehole holdup. In this method, the entire spectrum from first neutron detector 112, second neutron detector 114, and/or gamma ray detector 166 (e.g., referring to FIGS. 2, 3A, and 3BBBBB) may be used. However, this may generate "null" model-characteristics and, more importantly, it may lose its fundamental correlation behavior that may be determined by the methods described above utilizing physics.

Figure 8:
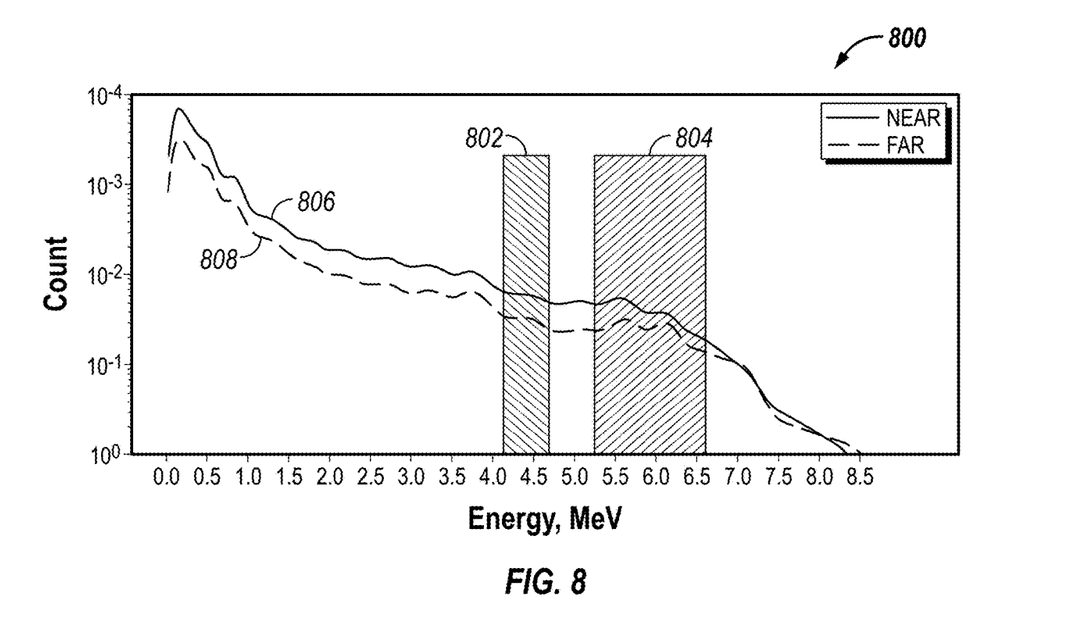
FIG. 8 illustrates Carbon and Oxygen count rates.
Figure 9A:
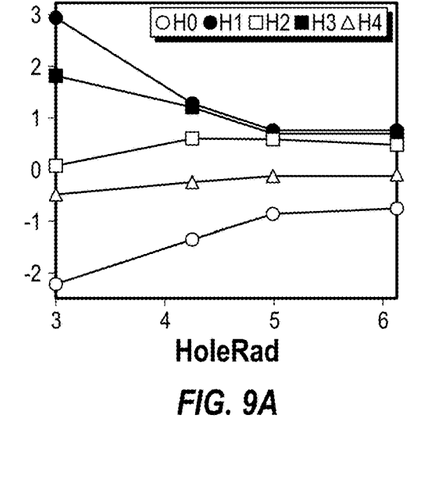
FIG. 9A-9E illustrates the activation coefficient for borehole and formation variations.
Figure 9B:
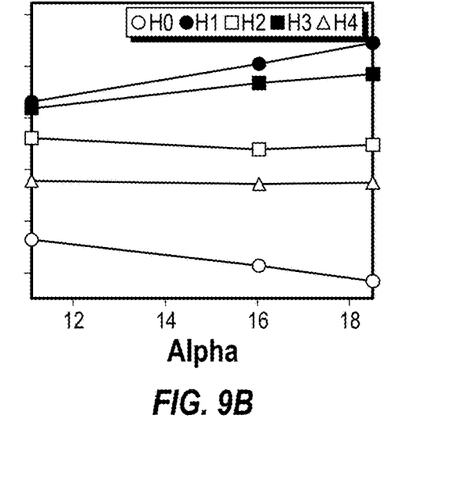
Figure 9C:
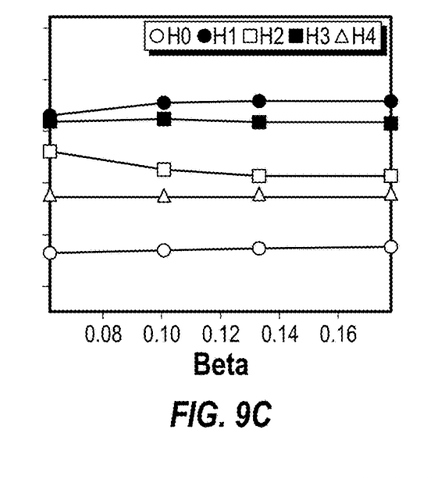
Figure 9D:
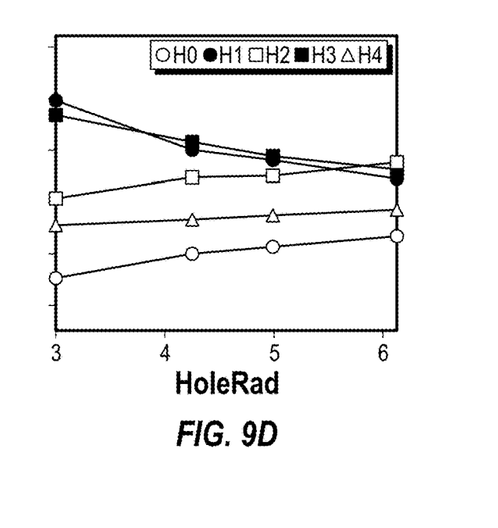
Figure 9E:
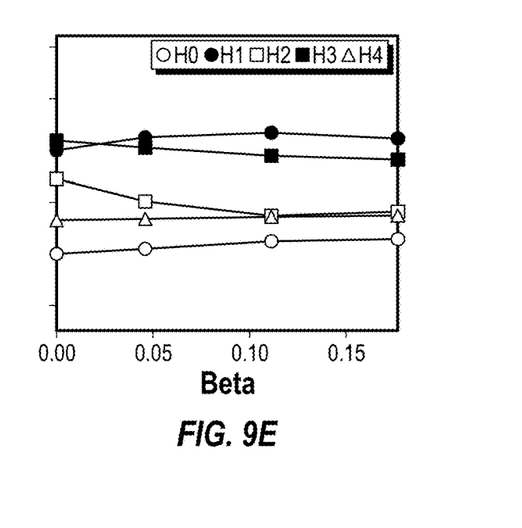

FIG. 8 illustrates a graph 800 of energy measurements taken by a near detector and a far detector. Additionally, the graph includes a selection window 8002 for carbon (4.144~4.699 MeV) and a selection window 804 for oxygen (5.254~6.623 MeV). A physics search algorithm is written to find best fitting formulation using the count-rate ratios from the near detector and the far detector which are recorded on graph 800 in FIG. 8. Count-rate ratios for near detector are identified along line 806 and count-rate ratios for the far detector are identified along line 808. In this algorithm, the code fits the data from MCNP simulation to various combination of formulations and finds the best fit. In this formulation search, four variables were used: CN/ON, CF/ON, ON/OF, and porosity. The search algorithm results in the best fitting formulation in the form of linear regression using nonlinear functions from the analytical physics model.

$$Y_0 = H_0 + H_1 * \log\left(\frac{CN}{ON}\right) + H_2 * e^{-\left(\frac{CF}{ON}\right)} + \quad (10)$$
$$H_3 * \left[\left(\frac{ON}{OF}\right)^3 + \left(\frac{ON}{OF}\right)^2 + \left(\frac{ON}{OF}\right)\right] + H_4 * e^{-\varphi}$$

$$Y_0 = H_0 + H_1 * \left(\frac{CN}{ON}\right) + H_2 * \left(\frac{CF}{OF}\right) + H_3 * \left(\frac{CF}{ON}\right) + H_4 * \varphi \quad (11)$$

$$Y_g = G_0 + G_1 * \log\left(\frac{COF}{CON}\right) + G_2 * \log\left(\frac{OF}{ON}\right) + G_3 * \varphi \quad (12)$$

Figure 10A:
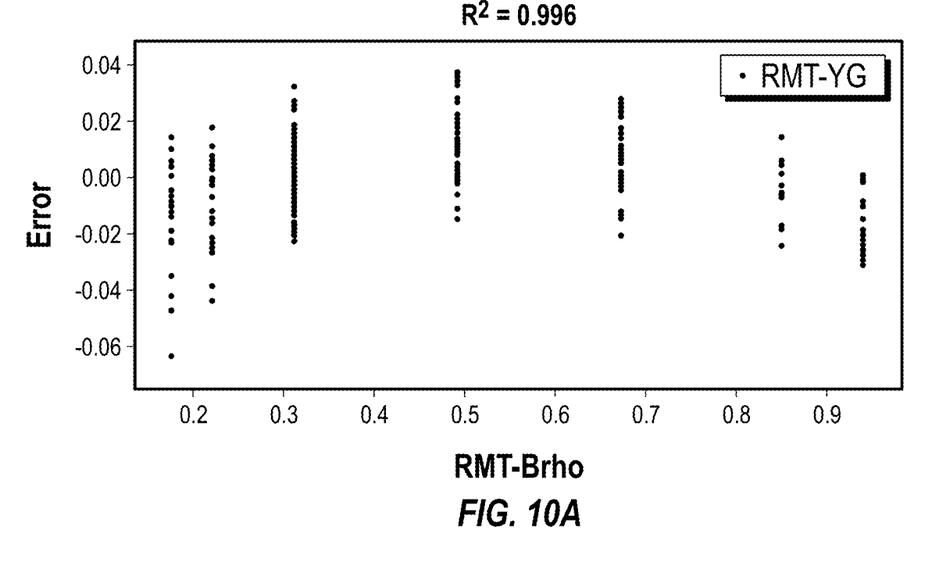
FIGS. 10A & 10B illustrates the holdup output and provides an error calculation.
Figure 10B:
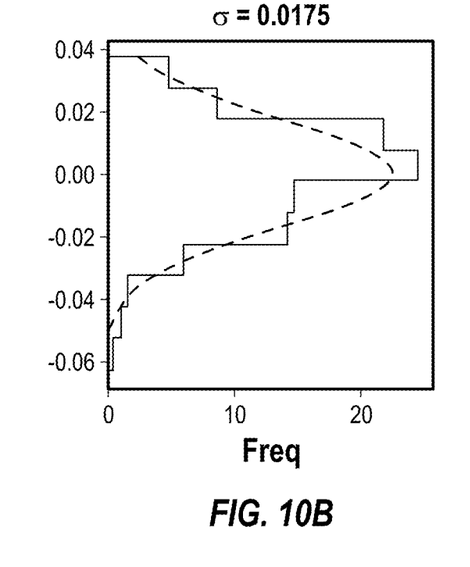

Each coefficient is a function of hole-size of borehole 104 (e.g., referring to FIG. 1), casing-size (for cased-hole only), standoff, and lithology. FIGS. 9A-9E illustrates an algorithm fidelity that uses a regularization penalty parameter (a=0.0005). Each Figure shows trained activation coefficients for each of the ratios listed above. FIGS. 10A and 10B illustrate finding cased hole holdup, with modeled quality and error distribution, respectively. Using activation functions shown in FIGS. 9A-9E, calculated holdup may be illustrated in FIG. 10A. As illustrated in FIGS. 10A and 10B, simple assisted-physics algorithms make it possible to achieve a fitting with quality of 0.996 with 2% holdup unit sigma variation (e.g., uncertainty). This is a significant improvement compared to the other existing methods where eccentric tool yields a significant uncertainty up to 40% holdup unit.

Figure 11:
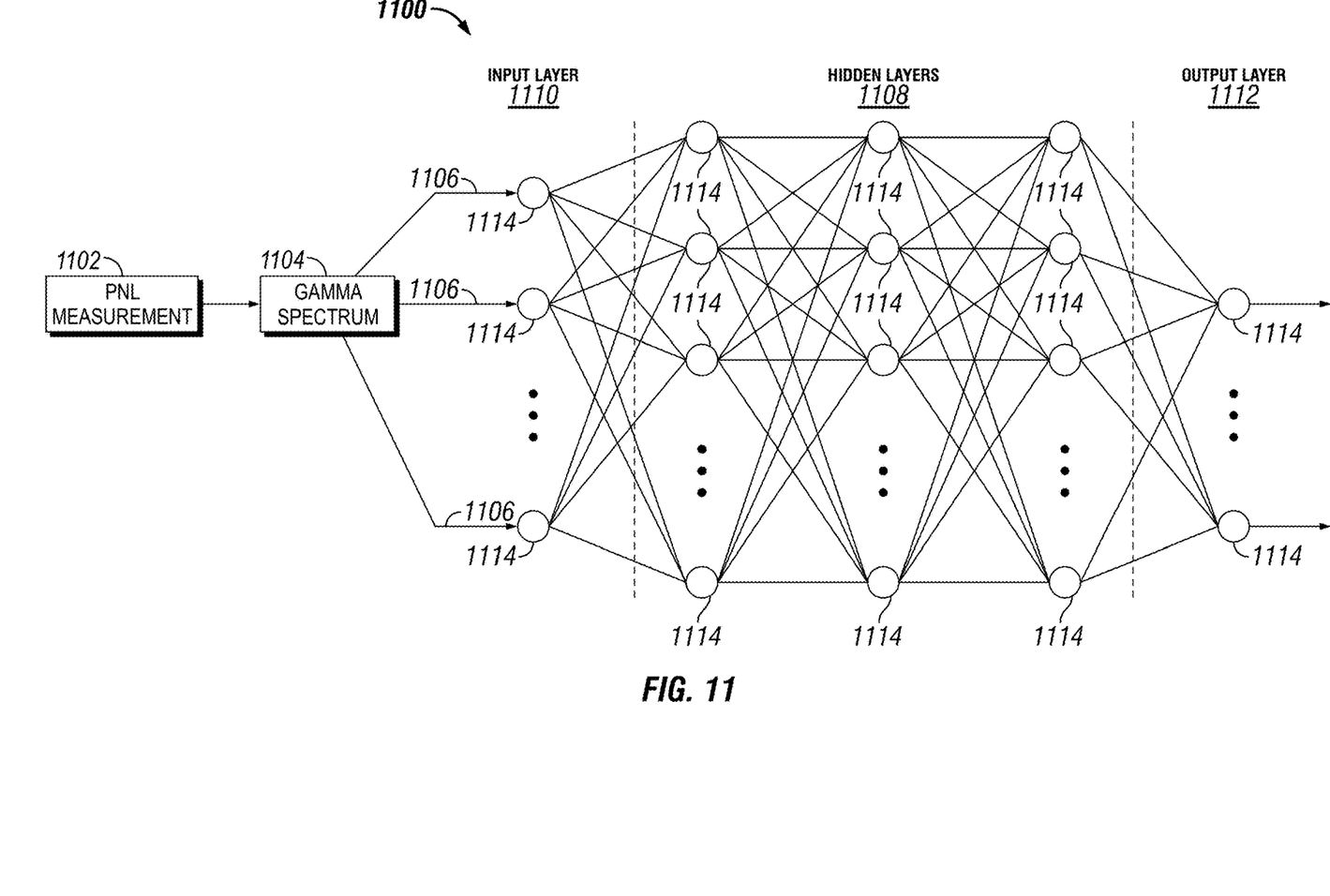
FIG. 11 depicts the processing of measurements in an assisted-physics neural network.

The methods discussed above may be implemented on a neural network. FIG. 11 illustrates an example of a neural network (NN) 1100 that may implement the methods discussed above. As illustrated in FIG. 11, pulsed-neutron logging tool 102 (e.g., referring to FIG. 1) may take pulsed neutron lifetime (PNL) measurements in block 1102. The PNL measurements in block 1102 are processed into a gamma spectrum in block 1104. The gamma spectrum is filtered to form an array of improved features which are inputs 1106 into NN 1100. NN 1100 is an artificial neural network with one or more hidden layers 1108 between input layer 1110 and output layer 1112. In examples, NN 1100 may be software on a single information handling system 122 (e.g., referring to FIG. 1). In other examples, NN 1100 may software running on multiple information handling systems 122 connected wirelessly and/or by a hard-wired connection in a network of multiple information handling systems 122. As illustrated, hidden layers 1108 are established using assisted-physics methods, discussed above, to target specific interaction or petrophysical contribution. For example, gamma spectrum data from block 1104 is moved to neurons 1114 in input layer 1110. Neurons 1114 may be defined as individual or multiple information handling systems 122 connected in a network. The output from neurons 1114 may be transferred to one or more neurons 1114 within one or more hidden layers 1108. Hidden layers 1108 include one or more neurons 1114 connected in a network that further process information from neurons 1114 according to the assisted physics-based methods discussed above. The number of hidden layers 1108 and neurons 1114 in hidden layer 1108 may be determined by an operator that designs NN 1100. Hidden layers 1108 may be defined as specific methods, discussed above, run on one or more information handling systems 122. Hidden layers 1108 spread computation to multiple neurons 1114, which may allow for faster computing, processing, training, and learning by NN 1100. The processing in hidden layers 1108 determines the material that is present in an area of investigation in borehole 104. Output layers 1112 may combine the processing in hidden layers 1108, using neurons 1114, to form data and images of the material in the area of investigation in borehole 104.

Improvements from the systems and methods described above may produce a more accurate holdup measurement and location of the holdup in a borehole, which is consistent across all landscapes of operational environments. The application of ML and AI interwoven as assisted physics is capable of processing measurements from a pulsed neutron logging tool. This processing leads to improved accuracy of measurement, improved generality and applicability of the solution, reduced dependency on rigorous computer simulations, and a 2 or 3-component holdup solution. The preceding description provides various examples of the systems and methods of use disclosed herein which may contain different method steps and alternative combinations of components.

Statement 1: A method my include disposing a pulsed-neutron logging tool into a borehole. The pulsed-neutron logging tool may include a neutron source configured to emit one or more neutrons into the borehole and one or more neutron detectors configured to measure one or more thermal neutrons, one or more epithermal neutrons, or combinations thereof. The method may further include transmitting the one or more neutrons into the borehole from the neutron source, measuring the one or more thermal neutrons, the one or more epithermal neutrons, or combinations thereof with the one or more neutron detectors, counting one or more gamma particles measured from a carbon nucleus with the one or more neutron detectors or one or more gamma ray detectors, integrating the one or more gamma particles over at least a radius, a polar angle, and an azimuthal angle originating from the neutron source to the one or more neutron detectors to identify a material in which the one or more gamma particles are passing through, and identifying a holdup in the borehole from the material.

Statement 2. The method of statement 1, further comprising identifying the one or more gamma particles using $I_{\gamma=4.43\ MeV} = T_c * \sigma_{inelastic} * \varphi_{5-14\ MeV}$, wherein $T_c$ is a carbon atomic density in the material, $\sigma_{inelastic}$ is an inelastic cross section of a carbon atom, and φ5~14 MeV is a neutron flux at a given point as a single-phase fast energy.

Statement 3. The method of statement 2, further comprising identifying a count rate of the one or more gamma particles at the one or more neutron detectors using Count Rate=$I\gamma e^{-\mu\rho x}$, wherein the material has a bulk density of ρ, a carbon atomic density Nc, x is a thickness of the material, and μ is a mass attenuation coefficient at 4.43 MeV.

Statement 4. The method of statement 3, further comprising identifying a borehole diffusion rate and a formation diffusion rate of the one or more gamma particles.

Statement 5. The method of statement 4, wherein the borehole diffusion rate is characterized by a macroscopic scatting cross section.

Statement 6. The method of statement 4, wherein the formation diffusion rate is characterized by a porosity, a saturation, and a lithology of a formation.

Statement 7. The method of statement 1, further comprising performing the integration of the one or more gamma particles with a neural network (NN).

Statement 8. The method of statement 7, wherein the NN may further include an input layer, that includes the one or more gamma particles, one or more hidden layers that integrate the one or more gamma particles over the radius, the polar angle, and the azimuthal angle originating from the neutron source to the one or more neutron detectors or the one or more gamma ray detectors to identify the material in which the one or more gamma particles are passing through, and an output layer, that identifies the holdup in the borehole from the material.

Statement 9. The method of statement 8, further comprising identifying one or more variations of the borehole or a formation with the NN.

Statement 10. The method of statement 9, wherein the one or more variations of the borehole include hole-size, casing-size, or a standoff.

Statement 11. The method of statement 9, wherein the one or more variations of the formation include a porosity, a saturation, or a lithology.

Statement 12. A system may include a pulsed-neutron logging tool. The pulsed-neutron logging tool may include a neutron source configured to emit one or more neutrons into a borehole and one or more neutron detectors configured to measure one or more thermal neutrons, one or more epithermal neutrons, or combinations thereof. The system may further include an information handling system that is configured to count one or more gamma particles measured from a carbon nucleus with the one or more neutron detectors, integrate the one or more gamma particles over at least a radius, a polar angle, and an azimuthal angle originating from the neutron source to the one or more neutron detectors to identify a material in which the one or more gamma particles are passing through, and identify a holdup in the borehole from the material.

Statement 13. The system of statement 12, wherein the information handling system is further configured to identify the one or more gamma particles using $I_{\gamma=4.43\ MeV}=T_c*\sigma_{inelastic}*\varphi_{5\sim14\ MeV}$, wherein $T_c$ is a carbon atomic density in the material, $\sigma_{inelastic}$ is an inelastic cross section of a carbon atom, and φ5~14 MeV is a neutron flux at a given point as a single-phase fast energy.

Statement 14. The system of statement 13, wherein the information handling system is further configured to identify a count rate of the one or more gamma particles at the one or more neutron detectors or at one or more gamma ray detectors using Count Rate=$I\gamma e^{-\mu\rho x}$, wherein the material has a bulk density of ρ, a carbon atomic density Nc, x is a thickness of the material, and μ is a mass attenuation coefficient at 4.43 MeV.

Statement 15. The system of statement 14, wherein the information handling system is further configured to identify a borehole diffusion rate and a formation diffusion rate of the one or more gamma particles.

Statement 16. The system of statement 15, wherein the borehole diffusion rate is characterized by a macroscopic scatting cross section.

Statement 17. The system of statement 15, wherein the formation diffusion rate is characterized by a porosity, a saturation, and a lithology of a formation.

Statement 18. The system of statement 12, wherein the information handling system is further configured to perform the integration of the one or more gamma particles with a neural network NN.

Statement 19. The system of statement 18, wherein the NN may comprise an input layer, that includes one or more gamma particles, one or more hidden layers that integrate the one or more gamma particles over the radius, the polar angle, and the azimuthal angle originating from the neutron source to the one or more neutron detectors to identify the material in which the one or more gamma particles are passing through, and an output layer, that identifies the holdup in the borehole from the material.

Statement 20. The system of statement 19, wherein the information handling system is further configured to identify one or more variations of the borehole or a formation with the NN.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited. Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
disposing a pulsed-neutron logging tool into a borehole, wherein the pulsed-neutron logging tool comprises:
a neutron source configured to emit one or more neutrons into the borehole; and
one or more neutron detectors configured to measure one or more thermal neutrons, one or more epithermal neutrons, or combinations thereof;
transmitting the one or more neutrons into the borehole from the neutron source;
measuring the one or more thermal neutrons, the one or more epithermal neutrons, or combinations thereof with the one or more neutron detectors;
counting one or more gamma particles measured from a carbon nucleus with the one or more neutron detectors or one or more gamma ray detectors;
integrating the one or more gamma particles over at least a radius, a polar angle, and an azimuthal angle originating from the neutron source to the one or more neutron detectors to identify a material in which the one or more gamma particles are passing through; and
identifying a holdup in the borehole from the material.

2. The method of claim 1, further comprising identifying the one or more gamma particles using $I_{\gamma=4.43\ MeV} = T_c * \sigma_{inelastic} * \varphi_{5\sim14\ MeV}$, wherein $T_c$ is a carbon atomic density in the material, $\sigma_{inelastic}$ is an inelastic cross section of a carbon atom, and $\varphi 5\sim14$ MeV is a neutron flux at a given point as a single-phase fast energy.

3. The method of claim 2, further comprising identifying a count rate of the one or more gamma particles at the one or more neutron detectors using Count Rate=$I\gamma e^{-\mu\rho x}$, wherein the material has a bulk density of $\rho$, a carbon atomic density Nc, x is a thickness of the material, and $\mu$ is a mass attenuation coefficient at 4.43 MeV.

4. The method of claim 3, further comprising identifying a borehole diffusion rate and a formation diffusion rate of the one or more gamma particles.

5. The method of claim 4, wherein the borehole diffusion rate is characterized by a macroscopic scatting cross section.

6. The method of claim 4, wherein the formation diffusion rate is characterized by a porosity, a saturation, and a lithology of a formation.

7. The method of claim 1, further comprising performing the integration of the one or more gamma particles with a neural network (NN).

8. The method of claim 7, wherein the NN comprises:
an input layer, that includes the one or more gamma particles;
one or more hidden layers that integrate the one or more gamma particles over the radius, the polar angle, and the azimuthal angle originating from the neutron source to the one or more neutron detectors or the one or more gamma ray detectors to identify the material in which the one or more gamma particles are passing through; and
an output layer, that identifies the holdup in the borehole from the material.

9. The method of claim 8, further comprising identifying one or more variations of the borehole or a formation with the NN.

10. The method of claim 9, wherein the one or more variations of the borehole include hole-size, casing-size, or a standoff.

11. The method of claim 9, wherein the one or more variations of the formation include a porosity, a saturation, or a lithology.

12. A system comprising:
a pulsed-neutron logging tool comprises:
a neutron source configured to emit one or more neutrons into a borehole; and
one or more neutron detectors configured to measure one or more thermal neutrons, one or more epithermal neutrons, or combinations thereof;
an information handling system is configured to:
count one or more gamma particles measured from a carbon nucleus with the one or more neutron detectors;
integrate the one or more gamma particles over at least a radius, a polar angle, and an azimuthal angle originating from the neutron source to the one or more neutron detectors to identify a material in which the one or more gamma particles are passing through; and
identify a holdup in the borehole from the material.

13. The system of claim 12, wherein the information handling system is further configured to identify the one or more gamma particles using $I_{\gamma=4.43\ MeV} = T_c * \sigma_{inelastic} * \varphi_{5\sim14\ MeV}$, wherein $T_c$ is a carbon atomic density in the material, $\sigma_{inelastic}$ is an inelastic cross section of a carbon atom, and $\varphi 5\sim14$ MeV is a neutron flux at a given point as a single-phase fast energy.

14. The system of claim 13, wherein the information handling system is further configured to identify a count rate of the one or more gamma particles at the one or more neutron detectors or at one or more gamma ray detectors using Count Rate=$I\gamma e^{-\mu\rho x}$, wherein the material has a bulk density of $\rho$, a carbon atomic density Nc, x is a thickness of the material, and $\mu$ is a mass attenuation coefficient at 4.43 MeV.

15. The system of claim 14, wherein the information handling system is further configured to identify a borehole diffusion rate and a formation diffusion rate of the one or more gamma particles.

16. The system of claim 15, wherein the borehole diffusion rate is characterized by a macroscopic scatting cross section.

17. The system of claim 15, wherein the formation diffusion rate is characterized by a porosity, a saturation, and a lithology of a formation.

18. The system of claim 12, wherein the information handling system is further configured to perform the integration of the one or more gamma particles with a neural network NN.

19. The system of claim 18, wherein the NN comprises:
an input layer, that includes one or more gamma particles;
one or more hidden layers that integrate the one or more gamma particles over the radius, the polar angle, and the azimuthal angle originating from the neutron source to the one or more neutron detectors to identify the material in which the one or more gamma particles are passing through; and an output layer, that identifies the holdup in the borehole from the material.

20. The system of claim 19, wherein the information handling system is further configured to identify one or more variations of the borehole or a formation with the NN.

* * * * *